(12) United States Patent
Caronia et al.

(10) Patent No.: US 6,869,995 B2
(45) Date of Patent: Mar. 22, 2005

(54) WATER TREE RESISTANT CABLE

(75) Inventors: Paul J. Caronia, Annandale, NJ (US); Kawai P. Pang, Hillsborough, NJ (US); Michael J. Keogh, Pinehurst, NC (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 10/058,977

(22) Filed: Jan. 28, 2002

(65) Prior Publication Data

US 2003/0045617 A1 Mar. 6, 2003

Related U.S. Application Data

(63) Continuation-in-part of application No. 09/098,478, filed on Jun. 16, 1998, now abandoned.

(51) Int. Cl.[7] ............................. C08K 5/37; C08K 5/06; H01B 7/28
(52) U.S. Cl. ...................... 524/330; 524/331; 524/347; 524/377; 174/110 SR; 174/110 PM
(58) Field of Search .............................. 524/330–331, 524/347, 377; 174/110 SR, 110 PM

(56) References Cited

U.S. PATENT DOCUMENTS

| | | | | |
|---|---|---|---|---|
| 3,935,141 A | * | 1/1976 | Potts et al. | 524/322 |
| 3,956,420 A | | 5/1976 | Kato et al. | 174/110 PM |
| 4,067,836 A | * | 1/1978 | Potts et al. | 204/157.15 |
| 4,101,512 A | | 7/1978 | Schmidt et al. | 174/110 PM |
| 4,144,202 A | | 3/1979 | Ashcraft et al. | 174/110 PM |
| 4,305,849 A | | 12/1981 | Kawasaki et al. | 174/110 PM |
| 4,440,671 A | | 4/1984 | Turbett | 252/573 |
| 4,452,937 A | | 6/1984 | Keogh | 174/110 PM |
| 4,612,139 A | | 9/1986 | Kawasaki et al. | 252/511 |
| 4,812,505 A | | 3/1989 | Topcik | 524/377 |
| 5,731,082 A | | 3/1998 | Gross et al. | 428/379 |
| 5,837,939 A | | 11/1998 | Cieloszyk et al. | 174/110 PM |
| 6,203,907 B1 | * | 3/2001 | Keogh | 428/379 |
| 6,521,695 B1 | * | 2/2003 | Peruzzotti et al. | 524/505 |

FOREIGN PATENT DOCUMENTS

| | | |
|---|---|---|
| EP | 0 057 604 B1 | 10/1986 |
| EP | 0 735 545 B1 | 6/1999 |
| JP | 1-98643 | 4/1989 |
| JP | 3-247638 | 11/1991 |
| JP | 3-247640 | 11/1991 |
| JP | 11-147957 | 6/1999 |

OTHER PUBLICATIONS

Gustafsson et al., Stabilization of peroxide crosslinked polyethylene, *Die Angewandte Makromolekulare Chemie*, 1988; 261/262: 93–99.

Moisan, Etude de la migration et de la solubilite des antioxydants dans le polyethylene, *Ann. Telecommunic.*, 1979; 34; 53–59.

Gachter et al., ed., Plastics Additives Handbook 3rd Edition, 1990, Hanser Publishers, Munich.

* cited by examiner

*Primary Examiner*—Peter Szekely

(57) ABSTRACT

A composition comprising:
(i) polyethylene, and, based on 100 parts by weight of component (i),
(ii) about 0.3 to about 0.6 part by weight of 4,4'-thiobis (2-methyl-6-t-butylphenol); 4,4'-thiobis(2-t-butyl-5-methylphenol); 2,2'-thiobis(6-t-butyl-4-methylphenol); or a mixture of said compounds, and
(iii) about 0.4 to about 1 part by weight of a polyethylene glycol having a molecular weight in the range of about 1000 to about 100,000.

9 Claims, No Drawings

WATER TREE RESISTANT CABLE

This application is a continuation-in-part and claims priority under 35 U.S.C. §120 to U.S. patent application Ser. No. 09/098,478, filed Jun. 16, 1998 now abandoned, which is hereby incorporated herein by reference in its entirety.

BACKGROUND OF THE INVENTION

This invention relates to electric power cable insulated with a polyethylene composition having an improved resistance to water trees. A typical electric power cable generally comprises one or more conductors in a cable core that is surrounded by several layers of polymeric material including a first semiconducting shield layer, an insulating layer, a second semiconducting shield layer, a metallic tape or wire shield, and a jacket.

These insulated cables are known to suffer from shortened life when installed in an environment where the insulation is exposed to water, e.g., underground or locations of high humidity. The shortened life has been attributed to the formation of water trees which occur when an organic polymeric material is subjected to an electrical field over a long period of time in the presence of water in liquid or vapor form. The formation of water trees is believed to be caused by a complex interaction of the AC electrical field, moisture, time, and the presence of ions. The net result is a reduction in the dielectric strength of the insulation.

Many solutions have been proposed for increasing the resistance of organic insulating materials to degradation by water treeing. One solution involves the addition of polyethylene glycol, as a water tree growth inhibitor, to a low density polyethylene such as described in U.S. Pat. No. 4,305,849. An improvement in electrical performance was described in U.S. Pat. No. 4,440,671. The combined teachings of these patents, however, left room for improvements in processability, such as scorch resistance and sweat-out.

Various additives have been used in combination with polyethylene to achieve desired characteristics in the material. As discussed in greater detail below, it has been difficult to achieve the proper balance of additives due to undesirable interactions and competing effects. Phenolic antioxidants, such as the thiobis compounds discussed herein, have been added to polyethylene formulations to improve scorch resistance. For example, the phenolic antioxidant, 4,4'-thiobis(2-t-butyl-5-methylphenol) (TBM6), has been used as an additive in polyethylene compositions. TBM6, however, has generally been used at levels of 0.2% or lower. At higher levels, there is a serious issue with long-term storage of the material due to the TBM6 blooming or sweating out to the surface of the material.

Blooming, or sweating out, is the tendency of a component of a polymer formulation to migrate to the surface of the product. Sweating out is a process that occurs over time, usually becoming a problem after several weeks, and the problem is increased when the product is exposed to temperatures above or below the ambient temperature. Sweating out is undesirable for a number of reasons. When a component sweats out, there is a reduced amount of the component remaining within the product, and the remaining component has a reduced ability to perform its desired function within the product. Additionally, the presence of component on the surface of the product can cause an undesired interaction with adjacent products or materials or can lead to a loss of other desired properties of the product.

The conventional method for avoiding sweating out by an antioxidant component is to add the component to the formulation only in an amount small enough so that the component will not sweat out when the formulation is exposed to elevated temperatures. This will limit the properties of the resin which the antioxidant is supposed to retain and/or enhance. Alternatively, the problem of sweating out may be dealt with by limiting the storage life of the material or by accepting the material with deficiencies.

SUMMARY OF THE INVENTION

This invention relates to electric power cable insulated with a polyethylene composition having an improved resistance to water trees.

In one aspect, the present invention provides a polyethylene composition which demonstrates exemplary processability in its conversion to a cable insulation in terms of scorch resistance and sweat-out, and provides commercially acceptable water tree resistance and heat aging. Other aspects and advantages of the present invention will become apparent hereinafter.

In another aspect, the present invention provides a polyethylene composition which avoids the sweat-out problem typically caused by the use of TBM6 and other thiobis compounds, and therefore has improved characteristics and longer storage life, even when exposed to elevated temperatures.

According to the invention, a composition has been discovered which meets the above-identified characteristics.

The composition comprises:
(i) polyethylene, and, based on 100 parts by weight of component (i),
(ii) about 0.3 to about 0.6 part by weight of 4,4'-thiobis(2-methyl-6-t-butylphenol); 4,4'-thiobis(2-t-buytl-5-methylphenol); 2,2'-thiobis(6-t-butyl-4-methylphenol); or a mixture of said compounds; and
(iii) about 0.4 to about 1 part by weight of a polyethylene glycol having a molecular weight in the range of about 1000 to about 100,000.

While the prior art and conventional wisdom indicate that any amount of a phenolic antioxidant, such as a thiobis compound, greater than about 0.2% would be expected to exhibit severe sweating out, and the limitation or loss of desired properties such as retention of elongation, retention of tensile strength, and scorch resistance, the applicants of the present invention discovered the surprising and unexpected result that the combination of a relatively high level (about 0.3 to about 0.6 parts by weight) of 4,4'-thiobis(2-methyl-6-t-butylphenol); 4,4'-thiobis(2-t-butyl-5-methylphenol); 2,2'-thiobis(6-t-butyl-4-methylphenol); or a mixture of these compounds used in combination with a high level of polyethylene glycol (about 0.4 to about 1 part by weight) significantly reduces sweating out and enhances the properties of the resin.

The polyethylene compositions of the present invention exhibit the combination of (1) keeping the water tree growth rate less than about 45% as per the test described below; (2) maintaining elongation retention and tensile strength retention of greater than about 75% after heat aging as per the test described below; (3) providing a desirable degree of scorch resistance (as measured by a Moving Die Rheometer (MDR) or a Rubber Process Analyzer (RPA)) as per the test described below; and (4) limiting sweating out to less than about 100 ppm, despite increased levels of the specially selected antioxidants 4,4'-thiobis(2-methyl-6-t-butylphenol), 4,4'-thiobis(2-t-butyl-5-methylphenol), 2,2'-thiobis(6-t-butyl-4-methylphenol), or combinations thereof to retain desired properties.

A combination of the specially selected antioxidants and polyethylene do not provide the performance and attributes of the combination of polyethylene, specially selected antioxidants, and polyethylene glycol. Nor does the combination of polyethylene glycol and polyethylene provide such performance and attributes. Indeed, it has been surprisingly discovered that the combination of specially selected antioxidants, polyethylene glycol, and polyethylene at the levels described herein provide improved performance and attributes over all other antioxidants tested. Finally, just adding more of the specially selected antioxidants to retain or improve properties will increase sweat out and be deleterious to processing and will require the addition of more peroxide crosslinking agent.

DETAILED DESCRIPTION

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture of such homopolymers and copolymers. The mixture can be a mechanical blend or an in situ blend. Examples of the alpha-olefins are propylene, 1-butene, 1-hexene, 4-methyl-1-pentene, and 1-octene.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes can have a density in the range of 0.860 to 0.950 gram per cubic centimeter, and preferably have a density in the range of about 0.870 to about 0.930 gram per cubic centimeter. They also can have a melt index in the range of about 0.1 to about 50 grams per 10 minutes.

The polyethylenes can be produced by low or high pressure processes. They are preferably produced in the gas phase, but they can also be produced in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes include the following: magnesium/titanium based catalyst systems, which can be exemplified by the catalyst system described in U.S. Pat. No. 4,302,565 (heterogeneous polyethylenes); vanadium based catalyst systems such as those described in U.S. Pat. Nos. 4,508,842 (heterogeneous polyethylenes) and U.S. Pat. Nos. 5,332,793, 5,342,907, and 5,410,003 (homogeneous polyethylenes); a chromium based catalyst system such as that described in U.S. Pat. No. 4,101,445; a metallocene catalyst system such as that described in U.S. Pat. Nos. 4,937,299 and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), and high density polyethylene (HDPE) having a density greater than 0.940 gram per cubic centimeter. The latter four polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 degrees C., and in the tubulation reactor, the pressure is in the range of about 25,000 to about 45,000 psi and the temperature is in the range of about 200 to about 350 degrees C.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (a) a catalyst containing chromium and titanium, (b) a catalyst containing magnesium, titanium, a halogen, and an electron donor; or (c) a catalyst containing vanadium, an electron donor, an alkyl aluminum halide modifier, and a halocarbon promoter. Catalysts and processes for making the VLDPE are described, respectively, in U.S. Pat. Nos. 4,101,445, 4,302,565, and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and the terpolymer is generally referred to as an EPDM. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 1 to about 20 grams per 10 minutes, and is preferably in the range of about 3 to about 8 grams per 10 minutes. The alpha-olefins can be the same as those mentioned above, and the catalysts and processes are also the same subject to variations necessary to obtain the desired densities and melt indices.

As noted, included in the definition of polyethylene are homopolymers of ethylene made by a conventional high pressure process. The homopolymer preferably has a density in the range of 0.910 to 0.930 gram per cubic centimeter. The homopolymer can also have a melt index in the range of about 1 to about 5 grams per 10 minutes, and preferably has a melt index in the range of about 0.75 to about 3 grams per 10 minutes. Melt index is determined under ASTM D-1238, Condition E. It is measured at 190 degrees C. and 2160 grams.

Component (ii) is 4,4'-thiobis(2-methyl-6-t-butylphenol); 4,4'-thiobis(2-t-butyl-5-methylphenol); 2,2'-thiobis(6-t-butyl-4-methylphenol); or a mixture of said compounds. The amount of component (ii) that can be in the composition of the invention is in the range of about 0.3 to about 0.6 part by weight based on 100 parts by weight of component (i). It should be noted that this amount is the total amount of component (ii) regardless of whether it is a single compound or a mixture of two or more compounds.

Generally, the polyethylene glycol is defined by its molecular weight, which can be in the range of about 1000 to about 100,000, and is preferably in the range of about 5000 to about 35,000. The optimum molecular weight is 20,000 (prior to processing). It will be understood by those skilled in the art that processing the polyethylene glycol reduces its molecular weight by one third to one half. It will be further understood that the polyethylene glycol can be in the form of, for example, a copolymer of ethylene glycol and ethylene or in any other form, compound or polymer, which provides the same functionality as polyethylene glycol. Polyethylene glycol is a polar compound, which can be represented by the formulas $HOCH_2(CH_2OCH_2)_nCH_2OH$ or $HO(C_2H_4O)_nH$ wherein, for example, n can be 225 to 680. This translates into a molecular weight in the range of about 10,000 to about 35,000. The amount of polyethylene glycol that can be in the composition in the range of about 0.4 to about 1 part by weight based on 100 parts by weight of component (i).

It will be understood that, if one or more additional resins are introduced into the composition, the amounts of components (ii) and (iii) will be based on 100 parts by weight of the total resins in the composition. These resins can be various polyethylenes or polypropylenes, or other polymer additives commonly used in wire and cable.

Conventional additives, which can be introduced into the polyethylene formulation, are exemplified by antioxidants, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Fillers and additives can be added in amounts ranging from less than about 0.1 to more than about 200 parts by weight for each 100 parts by weight of the base resin, in this case, polyethylene.

Examples of antioxidants are: hindered phenols such as tetrakis[methylene(3,5-di-tert-butyl-4-hydroxyhydrocinnamate)]methane, bis[(beta-(3,5-ditert-butyl-4-hydroxybenzyl)-methylcarboxyethyl)]sulphone, and thiodiethylene bis(3,5-di-tert-butyl-4-hydroxy) hydrocinnamate; phosphites and phosphonites such as tri(2, 4-di-tert-butylphenyl)phosphite and di-tert-butylphenyl-phosphonite; thio compounds such as dilaurylthiodipropionate, dimyristyltlhiodipropionate, and distearylthiodipropionate; various siloxanes; and various amines such as polymerized 2,2,4-trimethyl-1,2-dihydroquinoline and diphenylamines. Antioxidants can be used in amounts of about 0.1 to about 5 parts by weight per 100 parts by weight of polyethylene.

In cable formation, levels of PEG and antioxidants (component (ii)) are carefully balanced to obtain the desired results of water tree resistance while avoiding the problem of sweating out. It is interesting to note that generally, 4,4'-thiobis(2-tert-butyl-5-methyl-phenol) (TBM6) had been used at levels of less than about 0.2% because of its low solubility and its tendency to sweat out or to bloom at higher levels. If the TBM6 sweats out, the shelf life of the compound and cable are diminished. In the compositions of the present invention, the surprising and unexpected result has been found that the PEG levels of 0.4% or greater serve to stabilize the TBM6 and reduce sweating out.

The resin, i.e., component (i), can be crosslinked by adding a crosslinking agent to the composition or by making the resin hydrolyzable, which is accomplished by adding hydrolyzable groups such as $-Si(OR)_3$ wherein R is a hydrocarbyl radical to the resin structure through grafting. It is preferred that the resin be crosslinked and that it be crosslinked with an organic peroxide.

The crosslinking of polymers with free radical initiators such as organic peroxides is well known. Generally, the organic peroxide is incorporated into the polymer by melt blending in a roll mill, a biaxial screw kneading extruder, or a Banbury™ or Brabender™ mixer at a temperature lower than the onset temperature for significant decomposition of the peroxide. Peroxides are judged for decomposition based on their half life temperatures as described in Plastic Additives Handbook, Gachter et al, 1985, pages 646 to 649. An alternative method for organic peroxide incorporation into a polymeric compound is to mix liquid peroxide and pellets of the polymer in a blending device, such as a Henschel™ mixer or a soaking device such as a simple drum tumbler, which are maintained at temperatures above the freeze point of the organic peroxide and below the decomposition temperature of the organic peroxide and the melt temperature of the polymer. Following the organic peroxide incorporation, the polymer/organic peroxide blend is then, for example, introduced into an extruder where it is extruded around an electrical conductor at a temperature lower than the decomposition temperature of the organic peroxide to form a cable. The cable is then exposed to higher temperatures at which the organic peroxide decomposes to provide free radicals, which crosslink the polymer.

Suitable crosslinking agents are organic peroxides such as dicumyl peroxide; 2,5-dimethyl-2,5-di(t-butylperoxy) hexane; t-butyl cumyl peroxide; and 2,5-dimethyl-2,5-di(t-butylperoxy)hexane-3. Dicumyl peroxide is preferred.

Hydrolyzable groups can be added, for example, by grafting an ethylenically unsaturated compound having one or more $Si(OR)_3$ groups such as vinyltrimethoxysilane, vinyltriethoxysilane, and gamma-methacryloxypropyltrimethoxy-silane to the homopolymer in the presence of the aforementioned organic peroxides. The hydrolyzable resins are then crosslinked by moisture in the presence of a silanol condensation catalyst such as dibutyltin dilaurate, dioctyltin maleate, dibutyltin diacetate, stannous acetate, lead naphthenate, and zinc caprylate. Dibutyltin dilaurate is preferred.

Examples of hydrolyzable grafted copolymers are vinyl-trimethoxy silane grated ethylene homopolymer, vinyltri-ethoxy silane grafted ethylene homopolymer, and vinyl-tributyoxy silane grafted ethylene homopolymer.

A cable using the composition of the invention can be prepared in various types of extruders, e.g., single or twin screw types. Compounding can be effected in the extruder or prior to extrusion in a conventional mixer such as a Brabender™ mixer or a Banbury™ mixer. A description of a conventional extruder can be found in U.S. Pat. No. 4,857, 600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked with an organic peroxide after extrusion, the die of the crosshead feeds directly into a heating zone, and this zone can be maintained at a temperature in the range of about 130° C. to about 260° C., and preferably in the range of about 170° C. to about 220° C.

The claimed compositions provide improved processability into a cable in terms of scorch resistance and reduction in sweat-out. In addition, heat aging and water tree growth resistance are generally as good or improved relative to commercially available materials.

In certain polyethylene compositions, 4,4'-thiobis(2-methyl-6-t-butyl phenol) and 2,2'-thiobis(6-t-butyl-4-methylphenol) have been found to cause a color problem, which, in spite of their scorch inhibitor qualities can be commercially unacceptable. This problem is solved by adding hydroquinone or a substituted hydroquinone in a sufficient amount to inhibit color formation. Details can be found in U.S. Pat. No. 6,103,374 for Crosslinkable Polyolefin Composition (D-17874), issued on Aug. 15, 2000 to Michael J. Keogh.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

All molecular weights mentioned in this specification are weight average molecular weights unless otherwise designated.

The patents and publications mentioned in this specification are hereby incorporated by reference in their entirety.

The following examples illustrate some of the various embodiments of the present invention.

EXAMPLES

In each of the examples, the balance of each formulation, in percent by weight, is an ethylene homopolymer having a density of 0.92 gram per cubic centimeter and a melt index of 2 grams per 10 minutes, and is prepared by a high pressure process. All amounts are given in percent by weight based on the weight of the total formulation.

PEG is polyethylene glycol having a molecular weight before processing of 20,000. Stabilizer A is 4,4'-thiobis(2-tert-butyl-5-methyl-phenol). Stabilizer B is 4,4'-thiobis(2-methyl-6-t-butylphenol). Dicumyl peroxide (Dicup) is present in the formulations of the examples in amounts between about 1.7 to about 2.1 percent by weight. In each case, Dicup is present in an amount sufficient to achieve an acceptable cure level.

The resistance of insulating compositions to water treeing is determined by the method described in U.S. Pat. No. 4,144,202. This measurement leads to a value for water tree resistance relative to a standard polyethylene insulating material. The term used for the value is "water tree growth rate" (WTGR). For WTGR, the lower the rate, the more desirable. Generally, to be acceptable, compositions should have a WTGR of about 45% or less using a specimen geometry as per ASTM Test D-6097-97 with a voltage stress of 5 kV at 1 kH at 23° C. for 30 days in a 1.0 M NaCl aqueous solution.

The homopolymer is compounded with PEG in a two roll mill operating at 24 revolutions per minute (rpm) on the front roll and 36 rpm on the back roll and a temperature of 125 to 130 degrees C. on the two rolls for about 10 minutes. The procedure involves preheating the resin to 70 degrees C. in an oven; fluxing the resin as quickly as possible on the two roll mill (about 3 to 4 minutes); adding PEG and 4,4'-thiobis-(2-tert-butyl-5-methyl-phenol) (TBM6) and fluxing for an additional 3 to 4 minutes; and then adding the peroxide and fluxing, peeling, and folding until well mixed. Sufficient dicumyl peroxide is introduced into each composition to provide a moving die rheometer (0.5 degree arc at 360 degrees F.) reading of about 3.0 inch-pound. Each composition is then removed from the two troll mill as a crepe and diced and molded into one inch discs which are 0.25 inch thick in a press in two steps:

|  | initial step | final step |
| --- | --- | --- |
| pressure (psi) | 2,000 | 40,000 |
| temperature (° C.) | 120 | 175 |
| residence time (minutes) | 9 | 15 to 20 |

Water Tree Growth Rate

Each plaque is tested for WTGR and the results compared with a control polyethylene composition, which exhibits 100 percent WTGR. Variables and results are set forth in Table 1. Percent PEG is shown along the horizontal axis. Percent Stabilizer is shown along the vertical axis. The numbers in the table represent the WTGR in percentages relative to the polyethylene control of 100%. As illustrated in Table 1, only at PEG concentrations of about 0.4% or greater (values in bold) does the composition have the desired WTGR of 45% or less under the test conditions as described above.

TABLE 1

Water Tree Growth Rate

| TBM6 % | PEG % | | | | | | | |
| --- | --- | --- | --- | --- | --- | --- | --- | --- |
|  | 0.00 | 0.01 | 0.05 | 0.10 | 0.15 | 0.40 | 0.60 | 0.80 |
| 0.18 |  | 347 | 254 |  |  |  |  |  |
| 0.22 |  |  |  |  | 60 |  |  |  |
| 0.25 |  |  | 73, 104 |  |  |  |  |  |
| 0.375 |  |  |  |  |  |  | 42, 43 |  |
| 0.40 |  |  |  |  |  | 40 | 25 | 16 |

Heat Aging

The following formulations are prepared on a laboratory twin screw mixer using a mixing melt temperature of 200 degrees C. followed by peroxide addition to effect crosslinking. The crosslinked material is then compression molded (using the condition described in WTGR sample preparation) into a laboratory plaque from which dog bone specimens as described in ASTM D-638 are prepared. The elongation property of the samples is tested without aging and after aging for two weeks in an air circulating oven at a temperature of 150 degrees C. following ASTM D-638. The criterion for passing this test is to retain greater than 75 percent elongation properties after this aging protocol.

In Table 2, PEG concentration in percent is shown along the horizontal axis. TMB6 concentration in percent is shown along the vertical axis. The numbers in the table illustrate heat aging and represent the percentage of retained elongation after two weeks at 150 C. Another measure of heat aging is retention of tensile strength, as will be shown in Table 5. The tensile strength of a composition is tested under the same conditions the elongation property. Acceptable values for heat aging, as measured by the variables of retention of elongation or retention of tensile strength, should be about 75% or greater for each variable.

As shown in Table 2, when the PEG concentration is 0.4% or greater (as desired for acceptable WTGR), the minimum level of 4,4'-thiobis-(2-tert-butyl-5-methyl-phenol) needed to meet the desired level of elongation retention is greater than 0.25 percent (values in bold). The data demonstrates that 0.375 weight percent 4,4'-thiobis-(2-tert-butyl-5-methyl-phenol) meets this criterion with 0.4 and 0.6 weight percent PEG. Table 2 sets forth the variables and results.

TABLE 2

Heat Aging (Percent Elongation Retention)

| TBM6 % | PEG % | | | | | |
|---|---|---|---|---|---|---|
| | 0.00 | 0.01 | 0.05 | 0.10 | 0.40 | 0.60 |
| 0.18 | 83 | 107 | 104, 99 | | | |
| 0.25 | | | 98, 108 | 104, 110 | 35 | 4 |
| 0.30 | | | | 101 | | |
| 0.35 | | | | | | 98 |
| 0.375 | | | | | 95 | 88 |
| 0.40 | | | | | | 101 |
| 0.45 | | | | | | 100 |

Scorch Resistance

To measure the scorch (pre-cure during extrusion) resistance of the homopolymer of ethylene as prepared for examples shown in Table 1, an instrument called a Moving Die Rheometer (MDR) 2000, described in ASTM D-5289, and a Rubber Process Analyzer (RPA) 2000, manufactured by Alpha Technologies, are used here for illustration. The MDR Mh is the maximum torque which represents the total cure level of a sample, and it is directly related to the total amount of active peroxide in the polymeric formulations. For accurate comparison of a material's scorch characteristics, the MDR Mh's should be comparable. Test conditions used for evaluating total cure by MDR are 182 degrees C.; 0.5 degree arc; 100 cycles per minute oscillation; and 12 minutes test time. Torque is reported in units of pounds-inch (lbs-in.). The total cure level of the examples shown in Tables 3a and 3b are approximately comparable (All MDR MH at 182 C. values between 2.93 to 3.28, data not shown.)

The RPA values are used to evaluate the material's resistance to scorch at actual extrusion conditions. The testing shown in Tables 3a and 3b was conducted using conditions of 150 degrees C.; 0.5 degree arc; 100 cycles per minute oscillation; 45 minutes test time. In Table 3a, the resistance to scorch was gauged by the RPA's Ts0.5, which is the time in minutes required for the torque to reach 0.5 lb in above the minimum torque. In Table 3b, the resistance to scorch was gauged by the RPA's Ts1.0 which is the time required for the torque to reach 1.0 lb in above the minimum torque. Under these testing conditions, Ts0.5 and Ts1 are measures of scorch time and the higher the Ts0.5 or Ts1 value, the higher the resistance to scorch.

While there is no single industry standard for scorch resistance, the greater the resistance (higher number), the better. The value obtained with 0.00% PEG and 0.18% TBM6 (upper left hand corner in Tables 3a and 3b) can be considered as a baseline for comparison. As illustrated in Tables 3a and 3b, unexpected improvement in scorch resistance was found at PEG concentrations of 0.4% and higher with TBM6 concentrations of 0.3% or higher (values in bold). Such improvement is not seen with increasing concentrations of TBM6 alone, as the TBM6 would tend to sweat out.

TABLE 3a

Scorch Resistance

| TBM6 % | PEG % | | | | | | | |
|---|---|---|---|---|---|---|---|---|
| | 0.00 | 0.01 | 0.05 | 0.08 | 0.10 | 0.15 | 0.40 | 0.60 |
| 0.18 | 17.05, 17.17 | 17.1 | 16.73 | 17.88 | | | 17.55 | |
| 0.2 | | | | | | 18.41 | | |
| 0.22 | | | 15.73 | | | 18.37 | | |
| 0.25 | 16.04 | | 19.06 | | 17.14, 17.56 | | 17.48 | 17.59 |
| 0.30 | 17.2 | | | | | | 20.75 | 19.22 |
| 0.35 | | | | | | | 20.53 | |
| 0.375 | | | | | | | | 24.99, 22.07 |
| 0.40 | 19.95 | | | | | | 22.34 | |
| 0.50 | | | | | | | 22.71 | |

RPA Scorch ts0.5 at 150 C., 100 CPM, 0.5 deg ARC, 45 min.

TABLE 3b

Scorch Resistance

| TBM6 % | PEG % | | | | | | | |
|---|---|---|---|---|---|---|---|---|
| | 0.00 | 0.01 | 0.05 | 0.08 | 0.10 | 0.15 | 0.40 | 0.60 |
| 0.18 | 26.92, 27.09 | 26.61 | 26.2 | 26.92 | | | 27.39 | |
| 0.2 | | | | | | 25.58 | | |
| 0.22 | | | 25.32 | | | 28.51 | | |
| 0.25 | 24.66 | | 29.57 | | 26.19, 27.16 | | 26.87 | 27.01 |
| 0.30 | 26.81 | | | | | | 31.96 | 29.98 |
| 0.35 | | | | | | | 31.6 | |
| 0.38 | | | | | | | | 39.49, 34.43 |
| 0.40 | 30.8 | | | | | | 34.58 | |
| 0.50 | | | | | | | 35.22 | |

RPA Scorch ts1.00 at 150 C., 100 CPM, 0.5 deg ARC, 45 min.

Sweat Out

In order to test for additive sweat out (blooming to pellet surface), which can cause extrusion problems such as loss of output or diameter variation, as well as decreasing the effect of the additive, a method involving washing 100 grams of pellets with 100 millimeters of methanol for 1 minute is used. The methanol is decanted after filtering through a 1 micron polypropylene filter, and is analyzed by High Pressure Liquid Chromatography (HPLC) for 4,4'-thiobis-(2-tert-butyl-5-methyl-phenol) concentration. As shown in the Table 4, the presence of PEG helps to solubilize the 4,4'-thiobis-(2-tert-4butyl-5-methyl-phenol) in the ethylene homopolymer, thus reducing its sweat out by two orders of magnitude after conditioning at 50 degress C. for 8 weeks. Under the conditions of this experiment, sweat out of less than 100 ppm is generally desirable for commercial applications.

The variables and results are set forth in Table 4. The numbers in Table 4 represent the concentration of Stabilizer A (TBM6) sweat out after 50 degrees C. for 8 weeks, expressed in parts per million (ppm).

TABLE 4

| | Sweat Out | | | | | | | | |
|---|---|---|---|---|---|---|---|---|---|
| | | | | PEG % | | | | | |
| TBM6 % | 0.00++ | 0.01 | 0.05 | 0.08 | 0.10 | 0.15 | 0.40 | 0.60 | 0.8 |
| 0.18 | 621, 741 | 678 | | 11 | | | | | |
| 0.22 | | | | 210 | | | | | |
| 0.25 | | | 678 | | 94, 24 | | | | |
| 0.375 | | | | | | | 2 | 1 | 1 |

As shown in Table 4, at PEG concentrations of 0.4% or greater, which are preferred to yield an acceptable WTGR, the compositions with a TBM6 concentration of 0.375% gave a compound with a desirable value for sweat out (values in bold).

Also shown in Table 4, with a TBM6 concentration of 0.18% and no PEG, the sweat out was greater than 600 ppm. While it would be expected that a greater concentration of TBM6 would increase the sweat out problem, surprisingly, higher concentrations of PEG (0.4% to 0.8%) significantly reduce sweat out and stabilize the relatively high levels of TBM6.

It may be noted that for determining sweat out, levels of TBM6 lower than 0.375% were not tested with PEG concentrations of 0.4% or higher. At lower levels of TBM6, low sweat out would be expected, but the desired heat aging criteria would not be met. TMB6 concentrations of greater than 0.3% showed the desired heat aging characteristics in the presence of PEG concentrations of greater than 0.4%. (see Table 2).

A series of antioxidants were tested to determine their effect on scorch resistance and heat aging (as measured by retention of tensile strength and retention of elongation). The antioxidants used are defined in Table 5.

TABLE 5

| Antioxidant | Category | Chemical Name | CAS # |
|---|---|---|---|
| TBM6 | Thiobis phenol | 4,4'-thiobis (2-t-butyl-5-methylphenol) | 96-69-5 |
| Irganox 1010 | Thiophenol | Tetrakis [methylene (3,5-di-t-butyl-4-hydroxy-hydrocinnamate)] methane | 6683-19-8 |
| Irganox 1035 | Phenol | Thiodiethylene bis (3,5-di-t-butyl-4-hydroxy-hydrocinnamate) | 41484-35-9 |
| DSDTP | Thio | Distearyl-3-3'-thiodipropionate | 693-36-7 |
| Ultra Q | Hydroquinone | 2,2,4-trimethyl-1,2,-hydroquinone | 26780-96-1 |
| Irgafos 168 | Phosphite | Tris (2,4-di-t-butylphenyl) phosphite | 31570-04-4 |

The antioxidants were used in combination with a low density polyethylene (LDPE) with a melt index of 1.9 and a density of 0.92, and PEG 20M, polyethylene glycol with a molecular mass of about 20,000. The results of these experiments are shown in Table 6. The data presented in Table 6 illustrate that, of the antioxidants tested, TBM6 is the only antioxidant that meets the desired industry standards for scorch resistance and heat aging.

TABLE 6

| | 1 | 2 | 3 | 4 | 5 | 6 | 7 | 8 | 9 | 10 | 11 | 12 |
|---|---|---|---|---|---|---|---|---|---|---|---|---|
| Raw Materials | | | | | | | | | | | | |
| LDPE | 99.1 | 98.8 | 99.1 | 98.8 | 99.1 | 98.8 | 99.1 | 98.8 | 99.1 | 98.8 | 99.1 | 98.8 |
| PEG 20M | 0.6 | 0.6 | 0.6 | 0.6 | 0.6 | 0.6 | 0.6 | 0.6 | 0.6 | 0.6 | 0.6 | 0.6 |
| TBM6 | 0.3 | 0.6 | 0 | 0 | 0 | 0 | 0 | 0 | 0 | 0 | 0 | 0 |
| Irganox 1010 | 0 | 0 | 0.3 | 0.6 | 0 | 0 | 0 | 0 | 0 | 0 | 0 | 0 |
| Irganox 1035 | 0 | 0 | 0 | 0 | 0.3 | 0.6 | 0 | 0 | 0 | 0 | 0 | 0 |
| DSDTP | 0 | 0 | 0 | 0 | 0 | 0 | 0.3 | 0.6 | 0 | 0 | 0 | 0 |
| Ultra Q | 0 | 0 | 0 | 0 | 0 | 0 | 0 | 0 | 0.3 | 0.6 | 0 | 0 |
| Irgafos 168 | 0 | 0 | 0 | 0 | 0 | 0 | 0 | 0 | 0 | 0 | 0.3 | 0.6 |
| sub-total | 100 | 100 | 100 | 100 | 100 | 100 | 100 | 100 | 100 | 100 | 100 | 100 |
| Dicup | 1.8 | 2.15 | 1.5 | 1.6 | 1.6 | 1.85 | 1.7 | 2 | 1.7 | 1.75 | 1.6 | 1.7 |
| Tests | | | | | | | | | | | | |
| MDR MH @ 182 C. (in-lb) | 3.07 | 3.06 | 2.99 | 3.07 | 3.03 | 3.17 | 2.55 | 2.2 | 3.23 | 3.07 | 3.06 | 3.01 |
| MDR ts1 @ 150 C./30 min | 20.48 | 26.68 | 14.87 | 16.4 | 14.4 | 17.19 | >30 | >30 | 11.79 | 14.16 | 8.99 | 9.38 |
| MDR ts1 @ 140 C./120 min | 59.23 | 83.6 | 44.76 | 51.17 | 43.4 | 52.13 | >120 | >120 | 35.47 | 43.63 | 24.32 | 26.89 |
| Tensile psi, fresh | 2486 | 2421 | 2683 | 3059 | 2625 | 2725 | 2726 | 1617 | 2971 | 2825 | 2838 | 2839 |
| Tensile psi, 150 C./1 wk | 2443 | 2732 | 761 | 2561 | 2465 | 2835 | 922 | 1063 | 2246 | 2579 | 763 | 768 |
| % retained tens | 98 | 113 | 28 | 84 | 94 | 104 | 34 | 66 | 76 | 91 | 27 | 27 |
| Tensile psi, 150 C./2 wk | 2198 | 2563 | 677 | 908 | 1092 | 2597 | 902 | 998 | 1968 | 2467 | 658 | 658 |
| % retained tens | 88 | 106 | 25 | 30 | 42 | 95 | 33 | 62 | 66 | 87 | 23 | 23 |
| Elongation %, fresh | 510 | 494 | 515 | 519 | 520 | 524 | 594 | 489 | 527 | 527 | 527 | 536 |
| Elongation %, 150 C./1 wk | 512 | 550 | 24 | 511 | 519 | 550 | 52 | 89 | 478 | 511 | 37 | 39 |
| % retained elongation | 100 | 111 | 5 | 98 | 100 | 105 | 9 | 18 | 91 | 97 | 7 | 7 |
| Elongation %, 150 C./2 wk | 461 | 531 | 34 | 12 | 40 | 524 | 43 | 83 | 453 | 501 | 40 | 36 |
| % retained elongation | 90 | 107 | 7 | 2 | 8 | 100 | 7 | 17 | 86 | 95 | 8 | 7 |

The numbers in bold in Table 6 indicate results that meet or exceed desired criteria. For scorch resistance, MDR ts1 indicates scorch time, and a longer time (larger number) indicates better scorch resistance. The standard for MDR ts1 at 150 C is 20 or greater, and the standard for MDR ts1 at 140 C is 50 or greater, preferably greater than 55. For tensile strength after cross linking and elongation, the standards are 75% retention after two weeks at 150 C.

The data presented in Table 6 illustrate that, of the antioxidants tested, TBM6 (Table 6, columns 1 and 2) is the only antioxidant that gives the combination of desired results meeting the desired industry standards for scorch resistance and heat aging. At 0.3% and 0.6% TBM6, MDR ts1 at 150 C values were 20.48 and 26.68, respectively, both exceeding the standard of greater than 20. The values of MDR ts1 at 140 C were 59.23 and 83.6, respectively, each greater than the preferred industry standard of at least 55. The retained tensile strengths after two weeks at 150 C were 88% and 106%, respectively for 0.3% and 0.6% TBM6, and the retained elongation values after two weeks at 150 C were 90% and 107%, respectively for 0.3% and 0.6% TBM6, each exceeding the industry standard of at least 75% retention.

While the antioxidant Irganox 1035 showed marginally acceptable results, its use is less desirable than that of TBM6. As shown in column 6 of Table 6, the scorch resistance results using 0.6% Irganox 1035 were 17.19 for MDR ts1 at 150 C, below the industry standard of greater than 20, and 52.13 for MDR ts1 at 140 C, within the minimal standard, but below the preferred industry standard of at least 55. Furthermore, to obtain results that are close to acceptable standards with Irganox 1035, 0.6% of the antioxidant was used. Better results were obtained by using only 0.3% TBM6.

Water Tree Growth Retardants Effect on Phenolic Antioxidants

Three different polyethylene formulations using different water tree growth retardants were prepared and tested for sweat-out of phenolic antioxidant and for water tree growth retardance. The polyethylene and TBM6 concentrations remained constant in the three formulations. The same techniques as described above were used, except that the sweat out was determined over 4 weeks rather than 8 weeks. The results of these experiments are shown in Table 7.

The water tree growth retardants in formulations II and III are commercially available products, and they are used in formulations II and III in amounts that are typical for their commercial use. The water tree growth retardant in formulation II is "GMAAX 8900" available from Elf Atochem. In formulation III, the polycaprolactone diol is "Tone 1270" sold by Union Carbide Corporation, and the poly(maleic anhydride-alt-1-octadecene) is sold by Aldrich Chemical Company under the designation "PA-18."

TABLE 7

| | Formulation | | |
|---|---|---|---|
| | I | II | III |
| Polyethylene | 100 | 100 | 100 |
| TBM6, wt. % | 0.375 | 0.375 | 0.375 |
| Water Tree Growth Retardant, wt. % | 0.6 polyethylene glycol (PEG), MW = 20,000 | 15 ethylene-methyl acrylate-maleic anhydride | 0.5 polycaprolactone diol and 0.15 poly(maleic anhydride-alt-1-octadecene) |
| Sweat-out, ppm | 1 | 6 | 17 |
| Water Tree Growth Retardance, % | 25 | 6 | 20 |

These results show that the TBM6 exhibits sweating out from formulations containing water tree growth retardants, except for the formulation containing PEG as the water tree growth retardant according to the present invention.

The compositions of the present invention, as illustrated by formulation I, containing phenolic antioxidants in amounts that would ordinarily be expected to exhibit significant sweating out, exhibit performance which is unexpected. The combination of PEG and relatively high levels of TBM6 dramatically reduces sweating out and surprisingly stabilizes the composition.

Obviously, numerous modifications and variations of the present invention are possible in light of the above teachings. These teachings serve as examples, and are not to be understood as limiting the scope of the present invention. It is, therefore, to be understood that, within the scope of the appended claims, the invention may be practiced otherwise than as specifically described herein.

We claim:

1. A composition comprising:
   (i) polyethylene, and based on 100 parts by weight of component (i),
   (ii) about 0.3 to about 0.6 part by weight of a thiobis phenolic antioxidant selected from the group consisting of 4,4'-thiobis(2-methyl-6-t-butylphenol); 4,4'-thiobis (2-t-butyl-5-methylphenol); 2,2'-thiobis(6-t-butyl-4-methylphenol); or a mixture of said compounds; and
   (iii) about 0.4 to about 1 part by weight of a polyethylene glycol having a molecular weight in the range of about 1000 to about 100,000,
   wherein the composition being capable of (a) preparing a moldable, test plaque having (1) a MDR ts1 at 150 degrees C. of at least about 20, (2) a MDR ts1 at 140 degrees C. of at least about 50, (3) a retention of tensile strength of at least about 75% after two weeks of aging at 150 degrees C., (4) a retention of elongation of at least about 75% after two weeks of aging at 150 degrees C., (5) water tree resistance less than about 45%, and (6) sweatout of less than about 100 ppm of the thiobis phenolic antioxidant and (b) imparting water tree resistance to the insulation of cables prepared therefrom.

2. The composition defined in claim 1 wherein component (ii) is 4,4'-thiobis(2-methyl-6-t-butylphenol).

3. The composition defined in claim 1 wherein component (ii) is 4,4'-thiobis(2-t-butyl-5-methylphenol).

4. The composition defined in claim 1 wherein component (ii) is 2,2'-thiobis(6-t-butyl-4-methylphenol).

5. The composition defined in claim 1 wherein the polyethylene glycol has a molecular weight in the range of about 5000 to 35,000.

6. A composition comprising:
   (i) a homopolymer of ethylene made by a high pressure process having a density in the range of 0.910 to 0.930 grain per cubic centimeter and a melt index in the range of about 1 to about 5 grams per 10 minutes, and, based on 100 parts by weight of component (i),
   (ii) about 0.3 to about 0.6 part by weight of a thiobis phenolic antioxidant selected from the group consisting of 4,4'-thiobis(2-methyl-6-t-butylphenol); 4,4'-thiobis (2-t-butyl-5-methylphenol); 2,2'-thiobis(6-t-butyl-4-methylphenol); or a mixture of said compounds; and
   (iii) about 0.4 to about 1 part by weight of a polyethylene glycol having a molecular weight in the range of about 5000 to about 35,000,
   wherein the composition being capable of (a) preparing a moldable, test plaque having (1) a MDR ts1 at 150 degrees C. of at least about 20, (2) a MDR ts1 at 140 degrees C. of at least about 50, (3) a retention of tensile strength of at least about 75% after two weeks of aging at at 150 degrees C., (4) a retention of elongation of at least about 75% after two weeks of aging at 150 degrees C., (5) water tree resistance less than about 45%, and (6) sweatout of less than about 100 ppm of the thiobis phenolic antioxidant and (b) imparting water tree resistance to cables prepared therefrom.

7. A cable comprising one or more electrical conductors or a core of electrical conductors, each conductor or core being surrounded by a layer of a composition comprising:
   (i) crosslinked polyethylene, and based on 100 parts by weight of component (i),
   (ii) about 0.3 to about 0.6 part by weight of a thiobis phenolic antioxidant selected from the group consisting of 4,4'-thiobis(2-methyl-6-t-butylphenol); 4,4'-thiobis(2-t-butyl-5-methylphenol); 2,2'-thiobis(6-t-butyl-4-methylphenol); or a mixture of said compounds; and
   (iii) about 0.4 to about 1 part by weight of a polyethylene glycol having a molecular weight in the range of about 1000 to about 100,000,
   wherein the composition (a) being capable of preparing a moldable, test plaque having (1) a MDR ts1 at 150 degrees C. of at least about 20, (2) a MDR ts1 at 140 degrees C. of at least about 50, (3) a retention of tensile strength of at least about 75% after two weeks of aging at 150 degrees C., (4) a retention of elongation of at least about 75% after two weeks of aging at 150 degrees C., (5) water tree resistance less than about 45%, and (6) sweatout of less than about 100 ppm of the thiobis phenolic antioxidant and (b) renders the cable water tree resistant.

8. The cable defined in claim 7 wherein the polyethylene glycol has a molecular weight in the range of about 5000 to 35,000.

9. A cable comprising one or more electrical conductors or a core of electrical conductors, each conductor or core being surrounded by a layer of a composition comprising:
   (i) a crosslinked homopolymer of ethylene made by a high pressure process having a density in the range of 0.910 to 0.930 gram per cubic centimeter and a melt index in the range of about 1 to about 5 grams per 10 minutes, and, based on 100 parts by weight of component (i),
   (ii) about 0.3 to about 0.6 part by weight of a thiobis phenolic antioxidant selected from the group consisting of 4,4'-thiobis(2-methyl-6-t-butylphenol); 4,4'-thiobis(2-t-butyl-5-methylphenol); 2,2'-thiobis(6-t-butyl-4-methylphenol); or a mixture of said compounds; and
   (iii) about 0.4 to about 1 part by weight of a polyethylene glycol having a molecular weight in the range of about 5000 to about 35,000,
   wherein the composition (a) being capable of preparing a moldable, test plaque having (1) a MDR ts1 at 150 degrees C. of at least about 20, (2) a MDR ts1 at 140 degrees C. of at least about 50, (3) a retention of tensile strength of at least about 75% after two weeks of aging at 150 degrees C., (4) a retention of elongation of at least about 75% after two weeks of aging at 150 degrees C., (5) water tree resistance less than about 45%, and (6) sweatout of less than about 100 ppm of the thiobis phenolic antioxidant and (b) renders the cable water tree resistant.

* * * * *